United States Patent
Lefebvre et al.

(10) Patent No.: US 7,742,053 B2
(45) Date of Patent: Jun. 22, 2010

(54) MULTI-THREAD GRAPHICS PROCESSING SYSTEM

(75) Inventors: Laurent Lefebvre, Lachenaie (CA); Andrew E. Gruber, Arlington, MA (US); Stephen L. Morein, Cambridge, MA (US)

(73) Assignee: ATI Technologies ULC, Markham, Ontario (CA)

( * ) Notice: Subject to any disclaimer, the term of this patent is extended or adjusted under 35 U.S.C. 154(b) by 367 days.

(21) Appl. No.: 11/746,453

(22) Filed: May 9, 2007

(65) Prior Publication Data

US 2007/0222787 A1 Sep. 27, 2007

Related U.S. Application Data

(63) Continuation of application No. 10/673,761, filed on Sep. 29, 2003, now Pat. No. 7,239,322.

(51) Int. Cl.
*G06T 1/00* (2006.01)
*G06F 13/18* (2006.01)
*G06F 15/80* (2006.01)

(52) U.S. Cl. .................. 345/522; 345/505; 345/535
(58) Field of Classification Search ................ 345/522, 345/502–505, 556, 558, 535
See application file for complete search history.

(56) References Cited

U.S. PATENT DOCUMENTS

| | | | |
|---|---|---|---|
| 5,550,962 | A | 8/1996 | Nakamura et al. |
| 6,118,452 | A | 9/2000 | Gannett |
| 6,384,824 | B1 | 5/2002 | Morgan et al. |
| 6,573,893 | B1 | 6/2003 | Naqvi et al. |
| 6,650,327 | B1 | 11/2003 | Airey et al. |
| 6,650,330 | B2 | 11/2003 | Lindholm et al. |
| 6,724,394 | B1 | 4/2004 | Zatz et al. |
| 6,731,289 | B1 | 5/2004 | Peercy et al. |
| 6,809,732 | B2 | 10/2004 | Zatz et al. |
| 6,864,893 | B2 | 3/2005 | Zatz |
| 6,897,871 | B1 | 5/2005 | Morein et al. |
| 6,980,209 | B1 | 12/2005 | Donham et al. |
| 7,015,913 | B1 | 3/2006 | Lindholm et al. |
| 2003/0076320 | A1 | 4/2003 | Collodi |
| 2004/0164987 | A1 | 8/2004 | Aronson et al. |

*Primary Examiner*—Hau H Nguyen
(74) *Attorney, Agent, or Firm*—Vedder Price PC

(57) ABSTRACT

A graphics processing system comprises at least one memory device storing a plurality of pixel command threads and a plurality of vertex command threads. An arbiter coupled to the at least one memory device is provided that selects a command thread from either the plurality of pixel or vertex command threads based on relative priorities of the plurality of pixel command threads and the plurality of vertex command threads. The selected command thread is provided to a command processing engine capable of processing pixel command threads and vertex command threads.

9 Claims, 4 Drawing Sheets

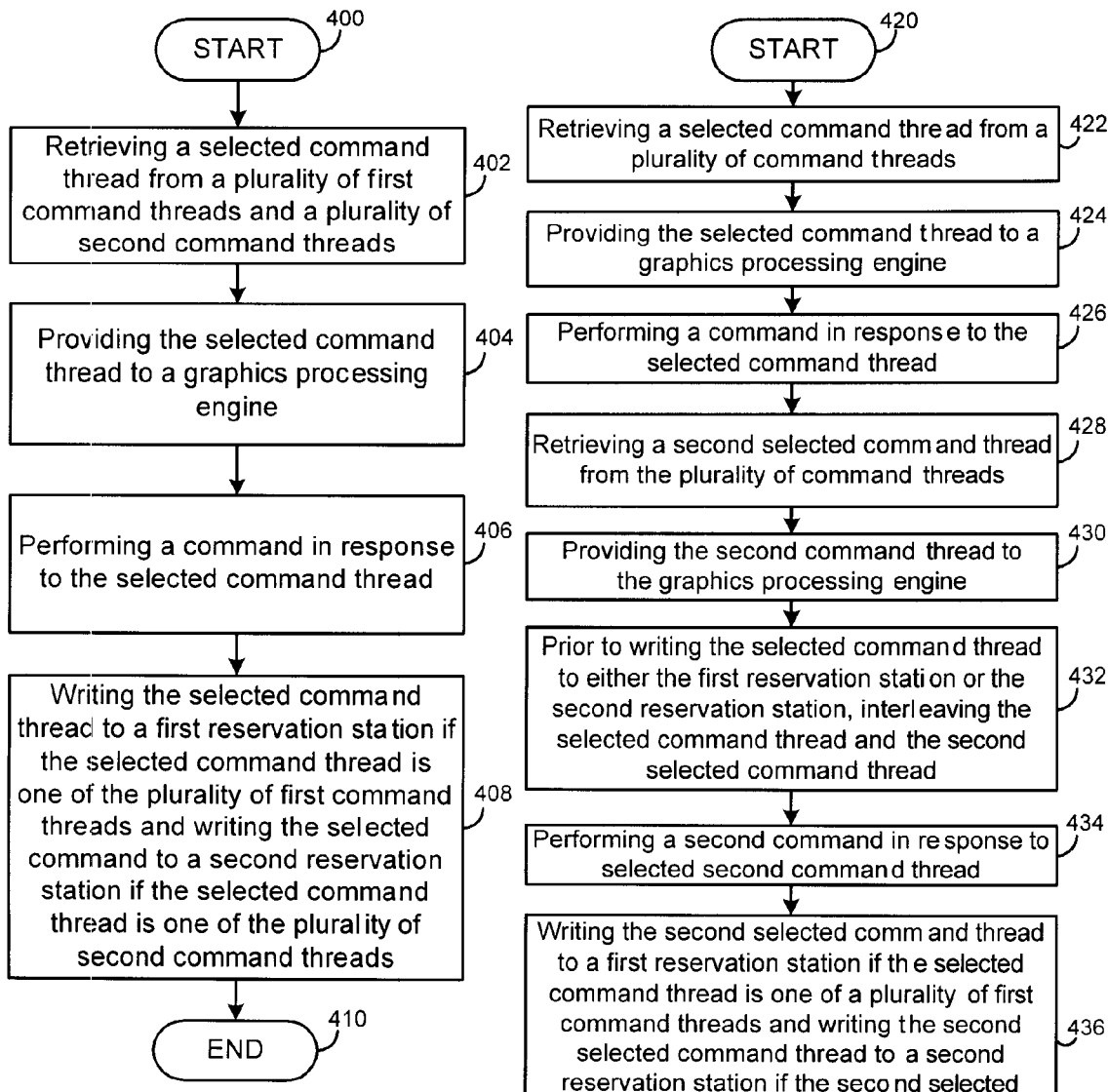

MULTI-THREAD GRAPHICS PROCESSING SYSTEM

CROSS-REFERENCE TO RELATED APPLICATIONS

The instant application is a continuation of U.S. patent application Ser. No. 10/673,761, filed Sep. 29, 2003, the entirety of which is incorporated herein by this reference. The instant application is also related to co-pending application Ser. Nos. 11/746,427 and 11/746,446, filed on even date herewith.

FIELD OF THE INVENTION

The present invention relates generally to graphics processing and more specifically to the interleaving of ALU operations with texture fetching operations.

BACKGROUND OF THE INVENTION

In a graphics processing system, it is important to manage and control multiple command threads relating to texture applications. In a typical graphics processing system, the processing elements, such as vertices and/or pixels, are processed through multiple steps providing for the application of textures and other processing instructions, such as done through one or more arithmetic logic units (ALU). To improve the operating efficiency of a graphics processing system, the control of the flow of the multiple command threads is preferred.

FIG. 1 illustrates a prior art sequencing system 100. The system 100 includes a first arbiter 102, a second arbiter 102 and a third arbiter 103 and multiple buffers 104, 106, 108 and 110. In a typical embodiment, the buffers are first in and first out (FIFO) buffers. Each of the buffers 104-110 include multiple command threads, such as 112, 114, 116, 118 stored therein. Moreover, the system 100 is divided into resource divisions, such as an ALU resource division 120 and a texture fetch resource division 122. In the ALU resource division 120, the command thread 118 may be received from an input command 124 as selected by the arbiter 101. The command thread 118 may then be withdrawn from the reservation stations 104 and 108 for the purpose of being provided to an ALU (not shown) and the command threads within the texture fetch resource division 122 maybe withdrawn from the reservation stations 106 and 110 to be provided to a texture fetch processors (not shown).

In the prior art embodiments of FIG. 1, the first buffer 104 receives an input command 124 and outputs a completed command thread 126 to the second arbiter 102. In one embodiment, the command thread may include an indicator, such as a flag, indicating when the access to the ALU resources has been completed for the associated command. The arbiter 102 receives the input command 124 and thereupon provides, in due course, the command thread to either an appropriate texture fetch buffer 110 or an ALU buffer 108. Thereupon, the steps are repeated where an output thread command 128 is provided to another ALU (not shown) or texture fetch processor (not shown) and returned to the buffer 108 or 110. The buffer 110 also produces the output 132 which is a command thread. The output 132 may be provided to another arbiter 103 to be provided further along the graphics processing pipeline.

The embodiment of FIG. 1 illustrates an inflexible system having specifically delineated ALU resource buffers and texture fetch resource buffers such that command threads must be sequentially provided between the various buffers 104, 106, 108 and 110. Furthermore, the system 100 of FIG. 1 does not support an unlimited number of dependent fetches based on the structure of the buffer 104-110 structure and connectivity between each other and with respect to available ALU resources and texture fetch resources.

As such, there is a need for a sequencing system for providing for the processing of multi-command threads that supports an unlimited number of dependent texture fetches.

BRIEF DESCRIPTION OF THE DRAWINGS

FIG. 6 illustrates a flowchart of a method for multi-thread command processing in accordance with one embodiment of the present invention; and FIG. 7 illustrates a flowchart of an alternative method for multi-thread processing.

DETAILED DESCRIPTION OF A PREFERRED EMBODIMENT

Generally, the present invention includes a multi-thread graphics processing system and method thereof including a reservation station having a plurality of command threads stored therein. A reservation station may be any type of memory device capable of reserving and storing command threads. Furthermore, a command thread is a sequence of commands applicable to the corresponding element, such as pixel command thread relative to processing of pixel elements and a vertex command thread relative to vertex processing commands. The system and method further includes an arbiter operably coupled to the reservation station such that the arbiter retrieves a first command thread of the plurality of command threads stored therein. The arbiter may be any implementation of hardware, software or combination thereof such that the arbiter receives the command thread and thereupon provides the command thread to a command processing engine. The system and method further includes the command processing engine coupled to receive the first command thread from the arbiter such that the command processor may perform at least one processing command from the command thread. Whereupon, a command processing engine provides the first command thread back to the associated reservation station.

The command processing engine may be any suitable engine as recognized by one having ordinary skill in the art for processing commands, such as a texture engine, an arithmetic logic unit, or any other suitable processing engine.

Figure 1:
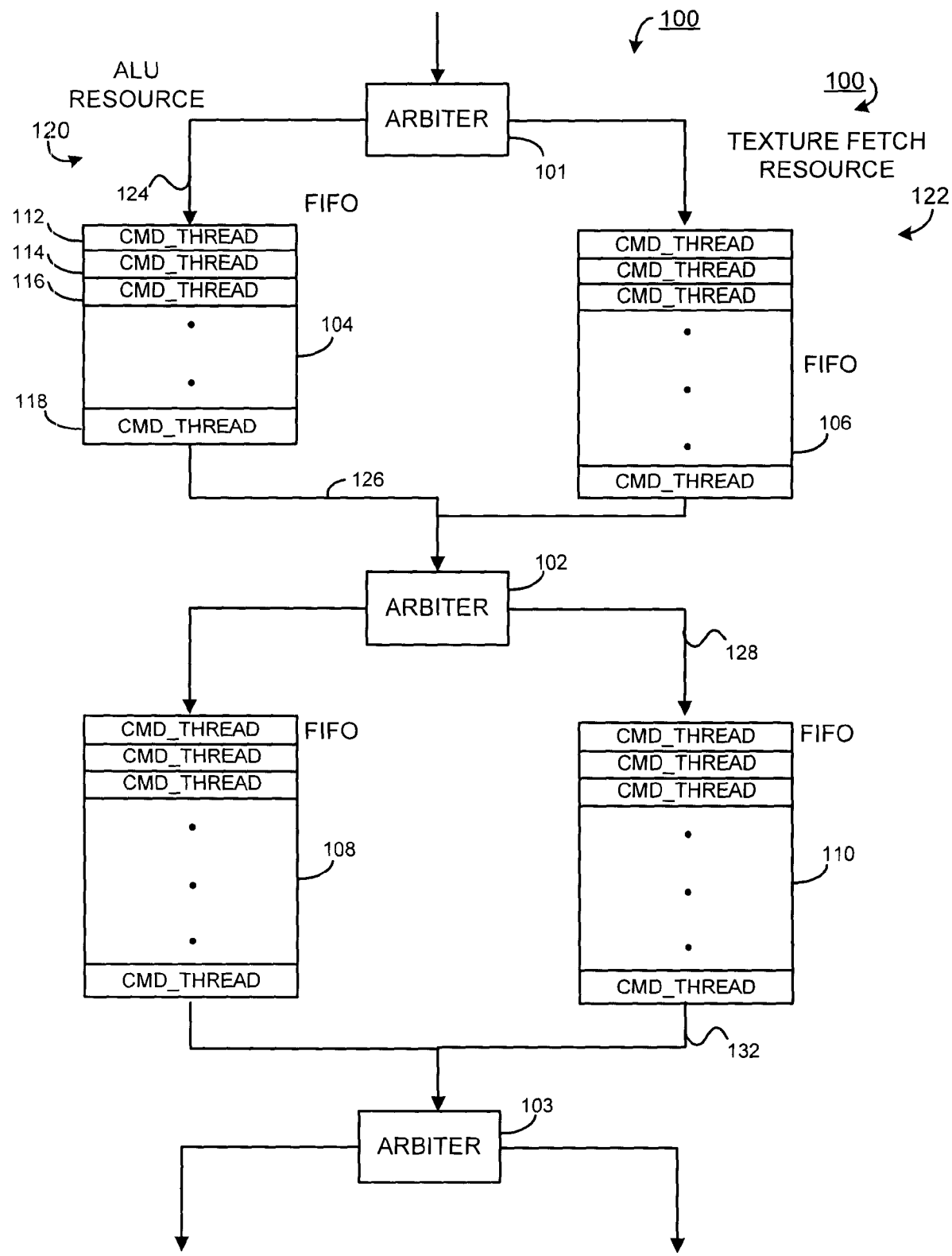
FIG. 1 illustrate the schematic block diagram of a prior art command thread processing system.
Figure 2:
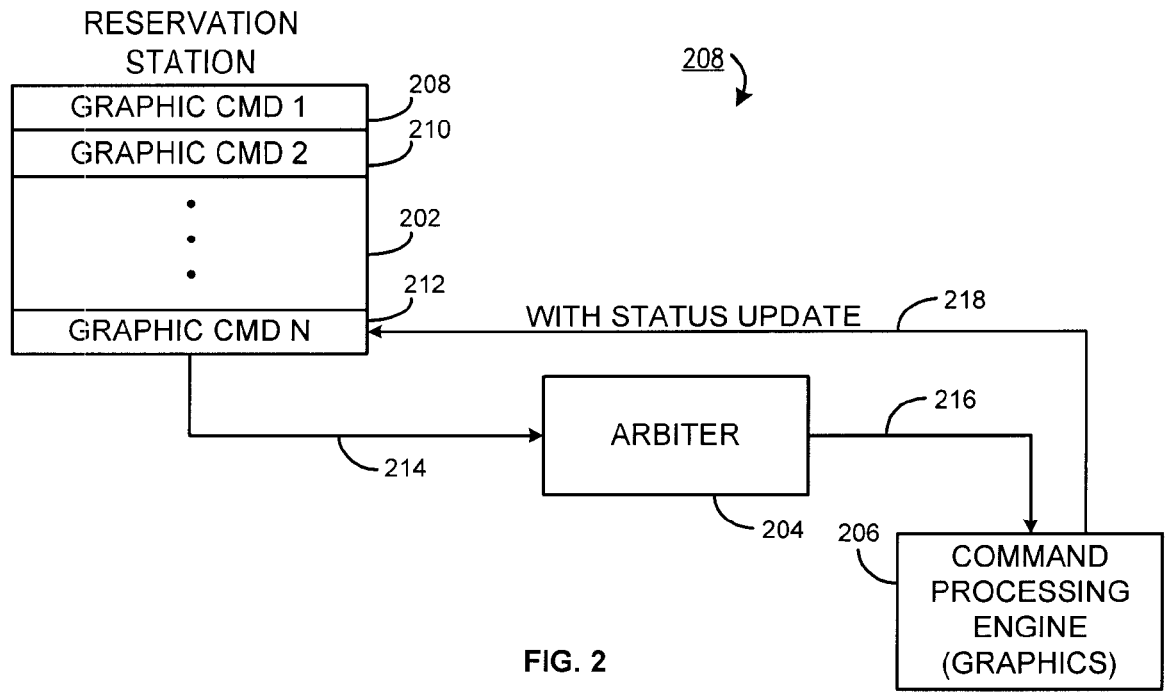
FIG. 2 illustrates a schematic block diagram of a multi-thread processing system, in accordance with one embodiment of the present invention.

More specifically, FIG. 2 illustrates one embodiment of a multi-thread processing system 200 in accordance with one embodiment of the present invention. The system 200 includes a reservation station 202, an arbiter 204 and a command processing engine 206. The reservation station includes a plurality of command threads 208, 210 and 212 for illustration purposes. In one embodiment, the command threads 208-212 are graphic command threads as illustrated in FIG. 2. As noted above, in one embodiment the reservation station 202 operates similar to a first in first out (FIFO) memory device, although command threads 208-212 may be retrieved from any location, whereas completed commands exit the memory device in a FIFO manner. The arbiter 204 retrieves a command thread via connection 214 and provides the retrieved command thread to the command processing engine 206, such as a graphics processing engine via connection 216. Thereupon, the command processing engine 206 performs a threaded command and provides a status update 218 to the reservation station 202, more specifically to the corresponding command thread, such as 208, 210 or 212.

The present invention provides for the processing of multiple threads. A command thread may go idle while waiting for available processing resources, such as specific data to be retrieved. As such, multiple threads prevent the corresponding resource from going idle. Further included within the command threads, 208-212, in one embodiment is an indicator, a done flag, which indicates when all of the commands within the command thread have been executed. Therefore, when all of the commands in the command thread have been executed and the command thread is retrievable from the reservation station 202, the command thread may be provided to a further processing element (not illustrated) within a graphics processing pipeline.

In one embodiment, the arbiter 204 retrieves the command threads 208-212 based on a priority scheme. For example, the priority may be based on specific commands that have been executed within a command thread or specific commands which are to be executed within a command for the effective utilization of the arbiter 204 and the command processing engine 206. In an alternative embodiment, the arbiter 204 may always retrieve the oldest available thread.

Figure 3:
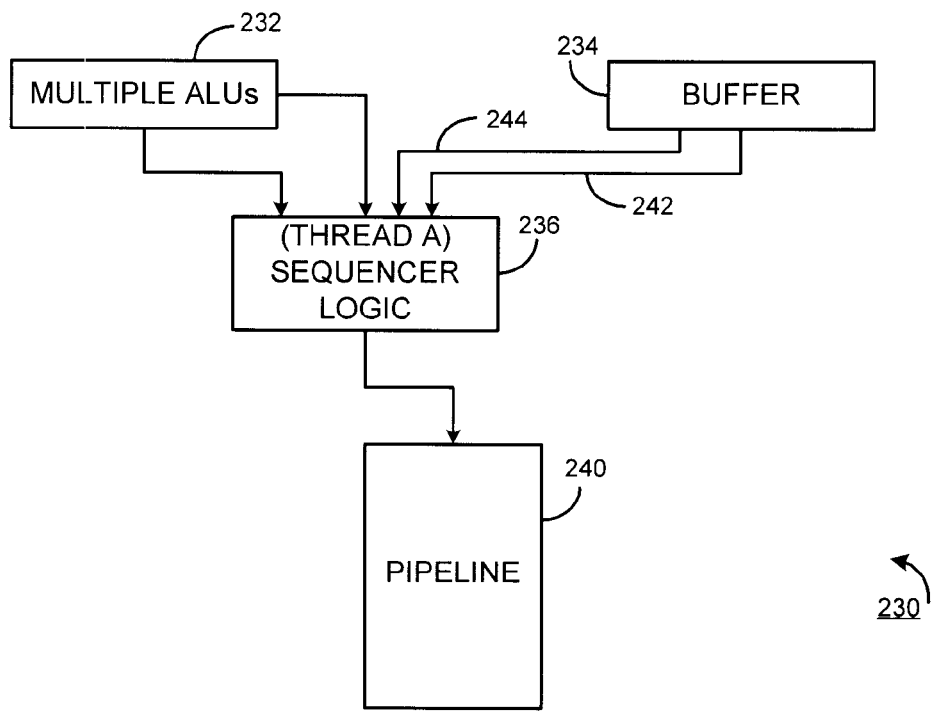
FIG. 3 illustrates a schematic block diagram of a pipeline vector machine in accordance with one embodiment of the present invention.

In accordance with one embodiment to the present invention, FIG. 3 illustrates a pipeline vector machine 230 including a multiple ALU system 232, a buffer 234 and sequencer logic 236, which may be an ALU resource. In one embodiment, the sequencer logic 236 receives a first thread 242, and a second thread 244 from the buffer 234, such that the logic 236 may perform simultaneous, interleaved execution of the command threads. Furthermore, the sequencer logic 236 is coupled to pipeline 240. In one embodiment, pipeline 240 may be an eight stage deep pipeline for providing vector analysis.

ALU arbitration proceeds in the same way as fetch arbitration. The ALU arbitration logic chooses one of the pending ALU clauses to be executed. The arbiter selects the command thread by looking at the reservation stations, herein vertex and pixel reservation stations, and picking the first command thread ready to execute. In one embodiment, there are two ALU arbiters, one for the even clocks and one for the odd clocks. For example, a sequence of two interleaved ALU clauses may resemble the following sequence: (E and O stands for Even and Odd sets of 4 clocks) Einst0 Oinst0 Einst1 Oinst1 Einst2 Oinst2 Einst0 Oinst3 Einst1 Oinst4 Einst2 Oinst0. As such, this way hides the latency of 8 clocks of the ALUs. Moreover, the interleaving also occurs across clause boundaries, as discussed in greater detail below.

Figure 4:
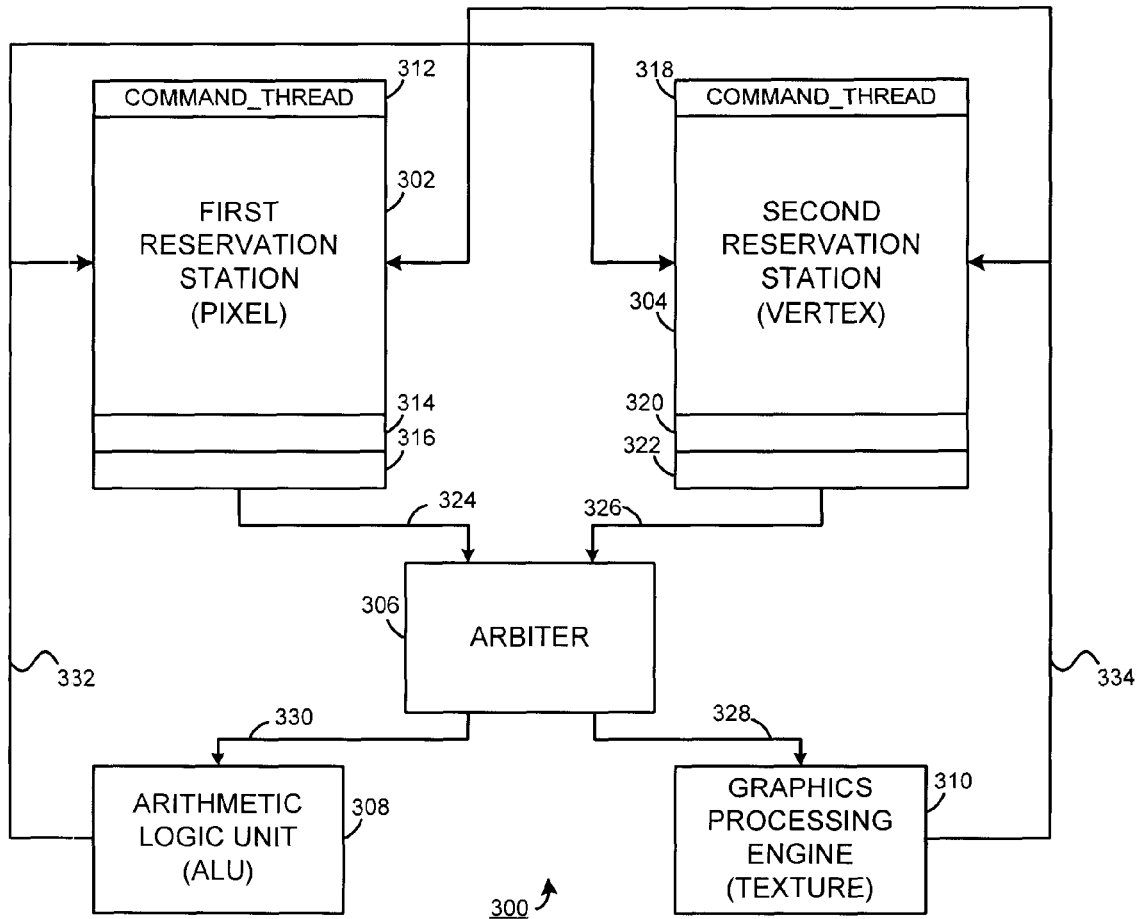
FIG. 4 illustrates a schematic block diagram of a multi-thread command processing system in accordance with one embodiment of the present invention.

FIG. 4 illustrates another embodiment of a multi-thread command processing system 300 having a first reservation station 302, a second reservation station 304, an arbiter 306, an ALU 308 and a graphics processing engine 310. In this embodiment, the first reservation station 302 is a pixel reservation station such that the command threads 312, 314 and 316 contain pixel-based commands therein. Furthermore, in this embodiment the second reservation station 304 is a vertex reservation station is directed towards vertex command threads illustrated as command threads 318, 320 and 322.

Although not illustrated in FIG. 4, in one embodiment an input arbiter provides the command threads to each of the first reservation station 302 and the second reservation station 304 based on whether the command thread is a pixel command thread, such as thread 312, or a vertex command thread, such as thread 318. In this embodiment, the arbiter 306 selectively retrieves either a pixel command thread, such as command thread 316, or a vertex command thread, such as command thread 322.

In one embodiment, each station 302, 304 maintains the state of each thread, such as threads 312-322. In one embodiment, the thread lives in a given location in the station 302, 304, in the order that the thread is received therein. From each buffer, the arbiter 306, which may be implemented as arbitration logic executed on a processing device, selects one thread for the graphics processing engine 310 and one thread for the ALU 308. Once a thread is selected by the arbiter 306, the thread is marked as invalid and submitted to the appropriate execution unit 308 or 312. Upon the execution of the associated command of the command thread, the thread is thereupon returned to the station 302 or 304 at the same storage location with its status updated, once all possible sequential instructions have been executed.

With respect to FIG. 4, a pixel command thread 324 may be retrieved by the arbiter 306 and a vertex command thread 326 may also be retrieved. The arbiter 306 then provides one thread 328, which may be either 324 or 326 to the graphics processing engine 310, such as a texture engine, and provides the other thread 330 to the ALU 308.

Upon execution of the command, the ALU 308 then returns the command thread 332 to the appropriate reservation station 302 or 304. As illustrated in FIG. 4, the ALU 308 is coupled to both reservation station 302 and reservation station 304 for providing the thread back thereto. The same data transfer occurs when the graphic processing engine 310 performs the commands and returns the command thread 334 back to the originating reservation station 302 or 304. It is also noted, that in the present embodiment, multiple command operations may be performed by a particular unit 308 or engine 310, but in order to switch a command thread from ALU 308 to a graphics processing engine 310, that command thread must be returned back to the appropriate reservation station 302 or 304 and re-retrieved by the arbiter 306 and thereupon provided to the other unit 308 or engine 310 respectively.

In one embodiment, each command thread within the reservation station 302 and 304 may be stored across two physical pieces of memory, wherein a majority of bits are stored in a one read port device. The bits required for the thread arbitration may be stored in a highly multi-ported structure, such that the bit stored in the one read port device are termed state bits and the bits stored in the multi-read port device are termed status bits.

In one embodiment the state bit includes, but is not limited to, a control flow instruction pointer, a loop iterater, a call return pointer, predicated bits, a GPR base pointer, a context pointer, valid bits, and any other suitable bits as recognized by one having skill in the art. It is also noted that in one embodiment, index pointers are not included in the state bits, wherein one embodiment may be stored in the general processing registers.

In this embodiment, the fields of the state bits, the control flow instruction pointer, the execution count marker, loop iteraters, call return pointers, predicate bits, are updated every time the thread is returned to the reservation station 302 or 304 based on how much progress has been made on the thread execution. It is also noted that in this embodiment, the GPR base pointer and context pointers are unchanged throughout the execution of the thread.

In one embodiment, the status bits include: a valid thread bit, a texture/ALU engine needed bit, a texture reads are outstanding bit and a waiting on texture read to complete bit. In this embodiment, all of the above status bit fields from the command threads go to the arbitration circuitry. Thereupon, the arbiter 306 selects the proper allocation of which command thread goes to the graphics processing engine 310 and which command thread goes to the ALU 308. In this embodiment, two sets of arbitration are performed: one for pixels, such as command thread 316 and one for vertices, such as command thread 322. Texture arbitration requires no allocation or ordering as it is purely based on selecting the oldest thread that requires the graphics processing engine 310.

Figure 5:
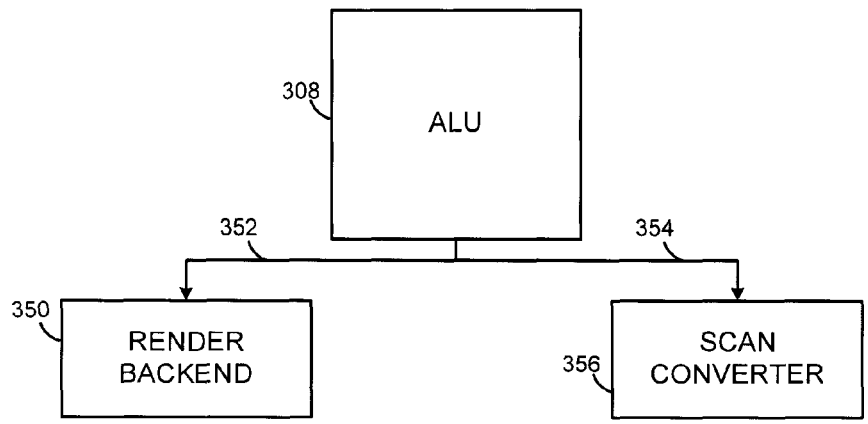
FIG. 5 illustrates a schematic block diagram of a graphics processing pipeline, in accordance with embodiment to the present invention.

FIG. 5 illustrates a block diagram representing the further execution of the command threads upon completion of all embedded commands therein. The ALU 308 is coupled to a render backend 350 via connection 352 and to a scan converter 356 via connection 354. As recognized by one having ordinary skill in the art, the ALU 308 may be operably coupled to the render backend 350 such that the bus 352 incorporates one or more of a plurality of connections for providing the completed command thread, such as command thread 316 of FIG. 4, thereto. Furthermore, as recognized by one having ordinary skill in the art, ALU 308 may be operably coupled to the scan converter 356 such that the connection 354 may be one or more of a plurality of connections for providing the executed command thread, such as command thread 322 of FIG. 4, to the scan converter 356. As discussed above, once the command thread's indicator bit, such as the done flag, is set, indicating all of the commands in the thread have been executed, the completed command thread is further provided in the processing pipeline. Moreover, the render backend 350 may be any suitable rendering backend for graphics processing as recognized by one having ordinary skill in the art. The scan converter 356 may be any suitable scan converter for graphics processing as recognized by one having ordinary skill in the art.

FIG. 6 illustrates a flow chart for a method of multi-thread command processing in accordance with one embodiment of the present invention. The method begins, step 400, by retrieving a selected command thread from a plurality of first command threads and a plurality of second command threads, step 402. For example, as discussed above with regard to FIG. 4, the selected command thread may be retrieved by the arbiter 306. The next step, step 404, is providing the selected command thread to a graphics command processing engine. As discussed above regarding FIG. 4, the arbiter 306 provides the selected command thread to the graphics processing engine 310, which, in one embodiment may be a texture engine. In another embodiment, the arbiter 306 may provide the selected command thread to the ALU 308.

The method further includes performing a command in response to the selected command thread, step 406. In this embodiment the command is performed by the graphics processing engine 310, which may be performing a texture operation. The next step, step 408, is writing the selected command thread to a first reservation station if the selected command thread is one of the plurality of first command threads and writing the selected command thread to a second reservation station if the selected command thread is one of the plurality of second command threads. With regard to FIG. 4, if the selected command thread is a pixel command thread, such as command thread 312-316, the graphics processing engine 310 provides the command thread 312-316 back thereto via connection 332. Furthermore, if the command thread is from the vertex reservation station 304, the command thread 318-320 may be provided thereto via connection 334 from the graphics processing engine 310. Thereupon, the method is complete, step 410.

FIG. 7 illustrates a flowchart of an alternative method for multi-thread processing. The method begins, step 420, by retrieving a selected command thread from a plurality of command threads, step 422, similar to step 402 of FIG. 6. The next step, step 424, is providing the selected command thread to a graphics processing engine, similar to step 404 of FIG. 6.

Thereupon, the method further includes performing a command in response to the selected command thread, step 426, similar to step 406 of FIG. 6. The next step, step 428, is retrieving a second selected command thread from the plurality of command threads. Similar to step 422, the second selected command thread may be retrieved from either a first reservation station, such as reservation station 302 of FIG. 4 or a second reservation station, such as reservation station 304 of FIG. 4.

The method further includes providing the second command thread to the graphics processing engine, step 430. The next step, step 432, is prior to writing the selected command thread to either the first reservation station or the second reservation station, interleaving the selected command thread and the second selected command thread. Thereupon, the method further includes performing a second command in response to the second selected command thread, step 434.

In the embodiment where the graphics processing engine is a texture engine, the commands performed are directed to texture operations. Although, as recognized by one having ordinary skill in the art, any other suitable graphics processing engine may be utilized.

The next step, step 436, is writing the second selected command thread to a first reservation station if the selected command thread is one of a plurality of first command threads and writing the second selected command thread to a second reservation station if the second selected command thread is one of a plurality of second command threads. Furthermore, the method includes writing the selected command thread to the first reservation station if the selected command thread is one of the plurality of first command threads and the selected command thread to the second reservation station if the selected command thread is one of the plurality of second command threads, step 438. Once again, using the exemplary embodiment of FIG. 4, the command threads, such as 312-316 and/or 318-322 may be provided from the graphics processing engine 310 and written back thereto or in another embodiment may be provided to the ALU 308 by the arbiter 306 and, upon execution of an arithmetic command, provided back to the associated reservation station, 302 or 304 respectively.

As such, the present invention allows for multi-thread command processing effectively using designated reservation station, in conjunction with the arbiter, for the improved processing of multiple command threads. The present invention further provides for the effective utilization of the ALU and the graphics processing engine, such as the texture engine, for performing operations for both pixel command threads and vertex command threads, thereby improving graphics rendering and improving command thread processing flexibility.

It should be understood that there exists implementations of other variations and modifications of the invention and its various aspects, as may be readily apparent to those of ordinary skill in the art, and that the invention is not limited by the specific embodiments described herein. For example, the storage capacity of the reservation stations may be adequately adjusted to accommodate the storage any suitable corresponding number of command threads. It is therefore contemplated and covered by the present invention any and all modifications, variations, or equivalents that fall within the scope of the basic underlying principles disclosed and claimed herein.

The invention claimed is:

1. A graphics processing system comprising:
   at least one memory device comprising a first portion operative to store a plurality of pixel command threads and a second portion operative to store a plurality of vertex command threads; and
   an arbiter, coupled to the at least one memory device, operable to select a command thread from either of the plurality of pixel command threads and the plurality of vertex command threads based on relative priorities of the plurality of pixel command threads and the plurality of vertex command threads.

2. The graphics processing system of claim 1, further comprising:
   a command processing engine, coupled to the arbiter, wherein the arbiter is further operable to provide the command thread to the command processing engine.

3. The graphics processing system of claim 1, wherein the first portion of the at least one memory device comprises a first memory device and the second portion of the at least one memory device comprises a second memory device.

4. The graphics processing system of claim 1, wherein a single memory device comprises the first portion and the second portion of the at least one memory device.

5. A graphics processing system comprising:
   at least one memory device comprising a first portion operative to store a plurality of pixel command threads and a second portion operative to store a plurality of vertex command threads;
   an arbiter, coupled to the at least one memory device, operable to select a command thread from either of the plurality of pixel command threads and the plurality of vertex command threads; and
   a plurality of command processing engines, coupled to the arbiter, each operable to receive and process the command thread.

6. The graphics processing system of claim 5, wherein the plurality of command processing engines comprises at least one arithmetic logic unit.

7. The graphics processing system of claim 5, wherein the plurality of command processing engines comprises at least one texture processing engine.

8. The graphics processing system of claim 5, wherein the first portion of the at least one memory device comprises a first memory device and the second portion of the at least one memory device comprises a second memory device.

9. The graphics processing system of claim 5, wherein a single memory device comprises the first portion and the second portion of the at least one memory device.

* * * * *